Aug. 26, 1958  W. H. SCHOENFELD, JR  2,848,819
METHOD OF DRYING A WET COATING ON THE
INTERIOR OF A CONTAINER BODY
Filed June 9, 1955

INVENTOR.
WILLIAM H. SCHOENFELD JR.
BY
ATTORNEYS

United States Patent Office 2,848,819
Patented Aug. 26, 1958

2,848,819

METHOD OF DRYING A WET COATING ON THE INTERIOR OF A CONTAINER BODY

William H. Schoenfeld, Jr., Glen Ellyn, Ill., assignor to American Can Company, New York, N. Y., a corporation of New Jersey Application June 9, 1955, Serial No. 514,164

4 Claims. (Cl. 34—21)

The present invention relates to a method of drying and hardening a coating composition applied to a can or container body moving at high speed as an incident to the manufacture of a tubular can or container, and has particular reference to applying an open flame to a wet coating on the interior of the can or container body as it is moving to remove the volatile, flammable solvent therein and leave a dry, hard, tough, resistant and continuous film on the body interior.

The use of a coating on the interior of a container or can body in order to present a barrier between the substrate material of the can and the product is well known in the art. This coating is generally applied as a solution of a film forming resin dissolved in a volatile, organic solvent. Before it can form an effective protective film on the surface of the can body, the solvent contained in the wet coating must be completely removed, so that only the dry resin film remains.

Although the prior art suggests removal of this volatile, organic solvent by the ignition thereof by means of an open flame, this method has achieved little or no commercial acceptance. In the prior art, the operation is performed with one end of the can closed and the solvent vapors are merely ignited and thereafter allowed to self-combust. The lack of sufficient oxygen in or the inaccessibility of oxygen to the interior of the closed end can causes incomplete combustion of the solvent vapors and a resulting sooty deposit on the surface of the coating. Further, this incomplete combustion of the solvent vapors coupled with the fact that at low concentrations of solvent in the coating, the rate of evaporation of the solvent is insufficient to support self-combustion, self-combustion of the solvent vapors ceases before all the solvent is removed from the coating thereby leaving a wet, or at least tacky coating.

The method generally in use today is to pass a can body having a wet coating on the interior thereof through a heated oven for about 8 to 10 minutes to evaporate the solvent. Aside from the large and expensive equipment used, the relatively slow speed and the hazard of disposing of inflammable vapors, this procedure has another serious disadvantage. During the prolonged exposure of the coated can body to the oven heat, which is necessary to evaporate all of the solvent from the coating, the resin solids in the coating are maintained at the elevated temperature for an excessively long period of time. This continued application of heat to the resin solids over the extended time generally causes discoloration or scorching thereof and, in some cases, degradation of the resin which lessens or destroys the efficiency of the resin as a protective film.

It is therefore an object of the present invention to provide a quick and efficient method of removing the solvent from a wet coating inside a container to form a soot-and track-free, continuous, protective layer on the inside of the container.

Another object is to provide a method of completely removing and combusting the solvent from a wet coating on the inside of a container.

Still another object is to provide a method of drying a wet coating on the inside of a container body without excessive scorching or discoloration of the resulting resin film.

Numerous other objects and advantages of the invention will be apparent as it is better understood from the following description, which taken in connection with the accompanying drawings, discloses a preferred embodiment thereof.

I have found that the above objects can be obtained by passing a container body open at both ends and having a wet coating on the interior thereof comprising a film forming resin dissolved in a volatile, flammable, organic solvent through open flames disposed adjacent and directed toward at least one open end of the container body, so that substantially the entire inside of the container body is swept with flame in order to drive the volatile solvent out of the wet coating, ignite the solvent vapors, and force the complete combustion thereof.

In the instant invention, the open flame is swept over or played directly on the wet coating for a relatively brief period of time and preferably inwardly from each open end of the container. In order to insure uniform contact of the open flame with the wet coating and thereby uniform heating of the wet coating, it is necessary to have both ends of the body open, enabling the flame to traverse the entire length of the body. It is further necessary to have both ends of the can open in order to allow easy escape of the gases of combustion of the solvent vapors and ready access of oxygen to the burning vapors inside the can.

By playing the flames directly on the wet coating, sufficient heat is transmitted to the coatings to drive out and combust all the solvent vapors therein in a short time. In this manner, maintaining the resin solids, the metal of the can body and any outside decoration or lithography at the solvent evaporation temperature for an extended time interval is obviated thereby preventing discoloration or other thermal damage to the coatings or can body.

Contrary to the teachings of the prior art, continued contact by the open flame on the wet coating is necessary to completely remove the solvent from the coating. When the freshly coated cans reach the open flame, the concentration of solvent vapors is sufficiently high to cause immediate ignition thereof and a resulting self-sustaining flame. However, as a concentration of vapors becomes less and less, due to the burning thereof, a point is reached where vapor concentration is insufficient to sustain the flame. Although this concentration is below that necessary to sustain a self-supporting flame, sufficient solvent is still present in the coating to cause it to be wet or at least tacky. The continued impinging of the open flame on this low solvent concentration coating drives the solvent therefrom and combusts it to leave a dry, non-tacky film. In order to obtain the complete removal and combustion of the solvent, direct contact between the flame and the coating should be maintained for from 1 to 10 seconds and preferably from 2 to 6 seconds.

The solvents used in the formation of the wet coatings should be as free as possible of unsaturated compounds. If too high a concentration of unsaturated compounds is present in the wet coating, upon combustion of the solvent vapors a smoky, sooty flame results. Also the boiling point, i. e. volatility, of the solvent should be within certain limits, about from 150° F. to 450° F. and preferably from 175° F. to 420° F. If too volatile a solvent is used, it is removed too rapidly from the wet coating whereby poor flow-out of and coverage by the resulting resin film occurs. On the other hand, if the volatility of the solvent is too low, excessive heating is necessary to remove it from the coating which is likely to damage the can body, e. g. melt the solder out of the side seam, and discolor or burn the resin of the coating or the outside lithography.

Among the solvents which are useful are: saturated aliphatic hydrocarbons such as mineral spirits; ketones, such as methyl-ethyl ketone, methyl-isobutyl ketone, cyclohexanone, diisobutyl ketone, isophorone; ether-alcohols such as methyl-Cellosolve and Carbitol; and alcohols such as isopropanol and butanol. The above solvent may be used singly or in combination with one another and may be mixed with small amounts of aromatics such as xylol, and toluol.

Any resin which is soluble in the above mentioned solvent, and which is capable of forming a continuous, protective film on the inside of the can body may be used in the instance invention. Examples of such resins are: vinyl resins such as polyvinyl chloride and vinyl chloride-vinyl acetate copolymers; stage B-phenolic resins; oleoresins; hydrocarbon polymer synthetic drying oils; alkyd resins, and synthetic rubbers such as butadiene-styrene copolymers and butadiene-acrylonitrile copolymers.

Referring to the drawings.

Figure 1:
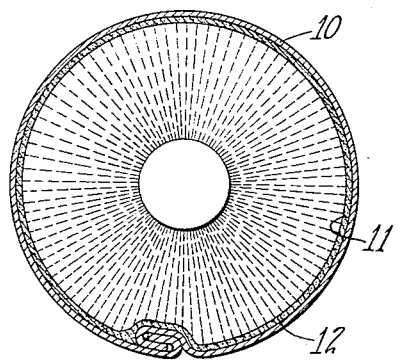
Fig. 1 is an end view of a can body showing the application of a well coating on the interior of the can body by means of a 360° spray.
Figure 2:
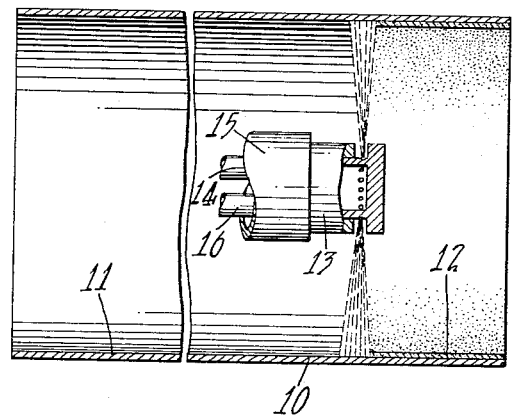
Fig. 2 is a longitudinal sectional view of a can body showing the deposition of a wet coating on the interior of the can body wall by means of a 360° spray.

As a preferred or exemplary embodiment of the instant invention, the drawings illustrate a can body 10 (Fig. 1) the interior surface 11 of which is being coated by a solution of film forming resin in a volatile solvent to dispose a wet coating 12 (Fig. 2) over the entire surface 11. The resin solution which is applied to surface 11 to form wet coating 12 is conducted to a nozzle 13 through a conduit 14 disposed within a sleeve 15. One end of conduit 14 is connected to any suitable source of supply of coating material. Heated, compressed air or other fluid medium which is utilized in the spray nozzle to atomize the coating material may be similarly conducted from a suitable source of supply through a second conduit 16 also disposed within the sleeve 15. Can body 10 moves longitudinally relative to nozzle 13 so that coating 12 is progressively applied to surface 11.

After the application of coating 12 to the entire inside surface 11 of can body 10 and while the coating 12 is still wet, the can body 10 is transferred by a suitable mechanism (not shown) to an inclined runway, track or channel 17 (Fig. 3) formed from a pair of spaced angle irons 18, 19 forming the runway 17 therebetween. The coated can body enters runway 17 with its longitudinal axis extending across runway 17, i. e. extending at right angles to the path of travel of the can body.

Adjacent and extending parallel to angle iron 18 and outside of runway 17 is a conduit or manifold 20 through which, from a suitable source not shown, is transported a combustible gas supplied to burners 21 attached to the conduit 20. A similar conduit 22 supplying combustible gas to the burners 23 is disposed adjacent and parallel to angle iron 19 on the opposite side of runway 17 from conduit 20. Burners 21 and 23 face inwardly toward runway 17 and the flame emanating from each burner 21 extends over runway 17 in one direction while the flame from each burner 23 extends other runway 17 in the opposite direction. The distance each opposed flame extends over runway 17 may be varied as desired, providing the combined flame lengths are sufficient to extend completely across the path of travel of can body 10, i. e. runway 17. In this manner every portion of coating 12 is contacted with flame to achieve uniform heating thereof as the can body 10 moves along runway 17.

Although it is important that every portion of the wet coating 12 be contacted by flame, merging of the flames should be avoided. It has been found that where portions of the flames merge, localized overheating of the coating 12 results which tends to overbake and discolor the resin of the coating in this localized area.

Figure 3:
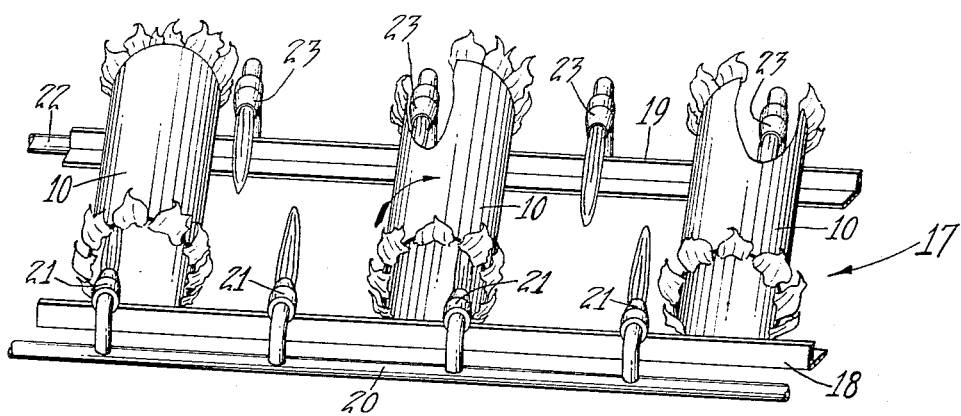
Fig. 3 is a perspective view illustrating one form of apparatus for subjecting the wet coating on the interior of the can bodies to an open flame, with parts broken away.

In Fig. 3 the burners 21, 23 are disposed horizontally and at right angles to the longitudinal direction of runway 17. Each burner 21 is offset laterally or staggered relative to its corresponding opposed burner 23. The flame emanating from each of burners 21, 23 extends at least half way across runway 17 but there is no probability of merging of opposed flames because of the staggered relationship of the burners.

It is to be understood that any angular arrangement of burners and flame lengths may be used in the instant invention providing the conditions of complete contact of the coating 12 by flame and avoidance of merging flames are met. For example, the opposed burners may be in alignment with each other with the combined lengths of flame from each just sufficient to span runway 17; or the opposed burners may be parallel and staggered relative to one another as shown in Fig. 3 but at a different angle to runway 17 and/or to the horizontal from that shown in Fig. 3; or the opposed burners may be at an angle to each other with the flame lengths adjusted accordingly. Further, although the preferred method of carrying out the instant invention, and the method of producing the best results, is to have the flame emanate from burners disposed on opposite sides of runway 17, satisfactory results may also be obtained by passing the can body through flames emanating adjacent one side only of runway 17, which flames are of sufficient length to traverse the entire length of the can body, i. e. extend completely across runway 17.

The can body 10 having the wet coating 12 on the interior thereof enters runway 17 at its uppermost part (to the left as viewed in Fig. 3), and rolls down runway 17 under the influence of gravity past the opposed burners 21, 23. As the can body 10 approaches the first burner, the flame therefrom comes into contact with the interior of the can body. Because of their heavy concentration inside can body 10, the solvent vapors immediately burst into flame. Although the heat evolved by the burning of the solvent vapors does heat the coating to drive out additional solvent vapors, it is insufficient to evaporate all of the solvent in the wet coating and at a sufficiently rapid rate to support continued combustion to these vapors. To maintain the continued combustion of the solvent vapors and also to supply sufficient heat to drive out all the solvent in the wet coating, the can bodies move past and are subjected to flame from additional burners extending along the path of travel of the can bodies. Sufficient burners are placed on each side of the runway 17 to insure complete solvent removal, combustion thereof and drying of the resin in the film to a solid, continuous coating around the entire interior of the can body.

As stated hereinbefore the minimum time for complete solvent removal and drying of the resin solids is 1 second and preferably 2 seconds. This necessary dwell time of the wet coating in contact with the flames from burners 21, 23 may be obtained either by passing the can body 10 having the wet coating 12 thereon slowly past a few burners, e. g. by providing channel 17 with only a slight declination, or by providing a large number of burners and passing the can body rapidly past each burner in sequence. Also as stated above, the maximum dwell time of the wet coating in contact with the open flames from the burners should be no more than 10 seconds preferably no more than 6 seconds. If the coating is subjected to flame in excess of this maximum limit, damage to the can body as well as scorching and degradation of the resin occur due to overheating.

It is to be understood that apparatus other than that set forth above may be used to carry out the method of the present invention. A conveyor, such as an endless belt, turret or star wheel of suitable refractory material, may be used in conjunction with runway 17 or other means to provide, instead of the gravity feed above, a more readily controlled, positive means of moving the can body 10 through the flame. Further, the can body 10 may be moved through the flame with its longitudinal axis extending vertically rather than horizontally with the burners disposed above and below the path of travel of the can.

It is thought that the invention and many of its attendant advantages will be understood from the foregoing description, and it will be apparent that various changes may be made in the steps of the method described and their order of accomplishment without departing from the spirit and scope of the invention or sacrificing all of its material advantages, the method hereinbefore described being merely a preferred embodiment thereof.

I claim:

1. A method of drying a wet coating on the interior of a tubular sheet metal can body comprising, moving a can body open at both ends along a predetermined path of travel with the longitudinal axis of said body transverse said path of travel thereby positioning said open ends adjacent each side of said path of travel, said can body having on the interior thereof a wet coating comprising a film forming resin carried in a volatile flammable liquid, passing said body through a series of open flames emanating adjacent each side of and extending into said path of travel, the opposed flames from each side of said path of travel being non-merging and having a combined length at least equal to said can body length, sequentially impinging said flames on the surface of said wet coating through both open ends of said can body whereby substantially the entire surface of said wet coating is swept with flame, and continuing said impingement for about from 1 to 10 seconds whereby said wet coating is heated to vaporize said volatile liquid completely and the vaporized liquid is completely combusted.

2. A method of drying a wet coating on the interior of a tubular sheet metal can body comprising moving a can body open at both ends along a predetermined path of travel with the longitudinal axis of said body transverse said path of travel thereby positioning said open ends adjacent each side of said path of travel, said can body having on its interior surface a wet coating comprising a film forming resin carried in a volatile flammable liquid, passing said body through a series of non-converging open flames emanating adjacent each side of and extending into said path of travel, the combined lengths of the opposed flames being at least equal to the length of said can body, and alternately and in sequence impinging said flames on the surface of said wet coating first through one open end of said body and then through the opposite open end of said body whereby substantially the entire surface of said wet coating is swept with flame, and continuing said impingement for about from 1 to 10 seconds whereby said wet coating is heated to vaporize the volatile liquid completely and the vaporized liquid is completely combusted.

3. The method set forth in claim 1 wherein said volatile flammable liquid predominantly comprises saturated compounds and has a boiling point about from 150° F. to 450° F.

4. The method set forth in claim 2 wherein said volatile flammable liquid predominantly comprises saturated compounds and has a boiling point about from 150° F. to 450° F.

References Cited in the file of this patent

UNITED STATES PATENTS

| | | |
|---|---|---|
| 933,324 | Mowry | Sept. 7, 1909 |
| 998,900 | Hodgson | July 25, 1911 |